(12) United States Patent
Capeau et al.

(10) Patent No.: US 9,890,068 B2
(45) Date of Patent: *Feb. 13, 2018

(54) METHOD FOR SEPARATING LIQUID FROM SUSPENDED MATTER IN A SLUDGE AND DEVICE FOR SAME

(75) Inventors: Patrice Capeau, Aix En Provence (FR); Michel Lopez, Coursan (FR); Pascal Gendrot, Jouy en Josas (FR)

(73) Assignee: Orege, Jouy En Josas (FR)

( * ) Notice: Subject to any disclaimer, the term of this patent is extended or adjusted under 35 U.S.C. 154(b) by 30 days.

This patent is subject to a terminal disclaimer.

(21) Appl. No.: 13/881,561

(22) PCT Filed: Oct. 28, 2011

(86) PCT No.: PCT/FR2011/000582
§ 371 (c)(1),
(2), (4) Date: Apr. 25, 2013

(87) PCT Pub. No.: WO2012/056128
PCT Pub. Date: May 3, 2012

(65) Prior Publication Data
US 2013/0227997 A1 Sep. 5, 2013

(30) Foreign Application Priority Data
Oct. 29, 2010 (FR) ..................................... 10 04284

(51) Int. Cl.
*C02F 11/14* (2006.01)
*B01D 21/01* (2006.01)
(Continued)

(52) U.S. Cl.
CPC .............. *C02F 11/14* (2013.01); *B01D 21/01* (2013.01); *B01D 21/02* (2013.01); *B01D 21/286* (2013.01);
(Continued)

(58) Field of Classification Search
CPC ................. C02F 1/24; C02F 1/52; C02F 1/20
See application file for complete search history.

(56) References Cited

U.S. PATENT DOCUMENTS 2,751,335 A * 6/1956 Carver .................. B01F 5/0256
196/46
2,766,203 A * 10/1956 Brown ............... B01D 17/0205
209/134
(Continued)

FOREIGN PATENT DOCUMENTS

EP       0514543 A1 * 11/1992
EP       0514543 A1    11/1992
(Continued)

OTHER PUBLICATIONS

Heij et al. ("Determining porosity profiles during filtration and expression of sewage sludge by NMR imaging", AIChE Journal, Apr. 1996, vol. 42, No. 4, p. 953-959).*

(Continued)

*Primary Examiner* — Krishnan S Menon
*Assistant Examiner* — Ryan B Huang
(74) *Attorney, Agent, or Firm* — Banner & Witcoff, Ltd.

(57) ABSTRACT

The invention relates to a method for separating the liquid part from the suspended matter in a sludge supplied in a continuous flow at a flow rate of $Q_{EB}=V$/hour. The flow is divided into at least two partial flows which are sprayed on top of one another into a sealed chamber of volume $v<V/20$, simultaneously injecting air therein at a flow rate d, said chamber being kept under overpressure conditions. The suspended matter of the thus treated flow is then left to decant in a collection container, with the cake or solid part falling to the bottom and separating from the liquid part which is continuously discharged.

21 Claims, 3 Drawing Sheets

(51) Int. Cl.
*B01D 21/02* (2006.01)
*B01D 21/28* (2006.01)
*C02F 1/54* (2006.01)
*C02F 1/20* (2006.01)
*C02F 1/74* (2006.01)
*C02F 11/12* (2006.01)

(52) U.S. Cl.
CPC ............... *C02F 1/54* (2013.01); *C02F 1/20* (2013.01); *C02F 1/74* (2013.01); *C02F 11/12* (2013.01); *C02F 2209/40* (2013.01); *C02F 2301/066* (2013.01); *C02F 2303/06* (2013.01)

(56) References Cited

U.S. PATENT DOCUMENTS

| | | | | | |
|---|---|---|---|---|---|
| 4,230,572 | A | * | 10/1980 | Hirs | B01D 25/007 210/230 |
| 4,415,452 | A | * | 11/1983 | Heil | C02F 1/385 210/195.3 |
| 4,456,534 | A | * | 6/1984 | Lambert | C02F 1/5236 210/725 |
| 5,069,783 | A | * | 12/1991 | Wang et al. | 210/196 |
| 5,935,448 | A | * | 8/1999 | Miller | C02F 1/54 210/705 |
| 6,214,228 | B1 | * | 4/2001 | Jones | C02F 3/226 210/603 |
| 6,884,347 | B1 | * | 4/2005 | Krieger | C02F 1/24 210/201 |
| 7,235,175 | B2 | * | 6/2007 | Brisset | C02F 9/00 210/199 |
| 2009/0246062 | A1 | * | 10/2009 | Holden | F04C 18/16 418/201.2 |
| 2010/0243580 | A1 | * | 9/2010 | Lobban | C02F 1/722 210/760 |

FOREIGN PATENT DOCUMENTS

| | | | | |
|---|---|---|---|---|
| FR | 2175897 | A1 | 10/1973 | |
| GB | 1429370 | A * | 3/1976 | ............ C02F 1/5236 |
| WO | WO 2009036512 | A1 * | 3/2009 | ............ C02F 1/722 |

OTHER PUBLICATIONS

International Search Report, in PCT/FR2011/000582 dated Dec. 23, 2011.
M.H. Rahman et al: "Pore Size Distribution and Hydraulic Conductivity of Digested Sludge Cake", J. Civ. Eng., vol. 24, No. 2, 1996, pp. 179-195.
Thomas D N et al; "Flocculation Modelling: A Review"—Review Paper, May 1, 1999, pp. 1579-1592.

\* cited by examiner

METHOD FOR SEPARATING LIQUID FROM SUSPENDED MATTER IN A SLUDGE AND DEVICE FOR SAME

The present invention relates to a method for separating the liquid part and the suspended matter of a sludge fed in continuous flow at a rate $Q_{EB}$=V/hour.

The invention thus allows elimination of virtually all of the suspended matter, in order to take this matter beneath a specified threshold.

The invention likewise relates to a device for sludge treatment that implements such a method.

The invention finds particularly significant, though not exclusive, application in the field of sludge dewatering and water clarification.

The invention results, surprisingly, from the use of a very high energy in a liquid, sludgy medium, which will in particular allow the colloidal structures within such an effluent to be attacked.

Colloids are present, indeed, in solid sludges (in their organic fraction), but also in waters.

It is these colloids in particular which cause a turbid coloration and which hinder the separation of solid and liquid phases and the decoloring of certain waters.

There are methods known for separating solid matter in suspension from the liquid effluent in which it is located.

The techniques in existence for extracting water from sludges are essentially compacting, which increases the solid-compound content (in % by weight of the total mixture) by an order of 5%; centrifuging or filtration, which each increase the solid-compound content by 18 to 25%; and, lastly, drying (by combustion or spreading for a number of weeks), which increases the solid-compound content by 90 to 95%, bearing in mind that the amount by weight of solid compound in treatment sludges prior to processing is in general between 0.1 to 1% of the total weight of the effluent.

All of these known treatments from the prior art have disadvantages, associated either with the insufficient drying (compacting, centrifuging, filtration) or with the treatment time (drying) or with the substantial consumption of energy (combustion).

Likewise known (FR 73.08654) is a method for treating sludge wastes wherein a watertight circuit comprising a tank, in which recirculation takes place for a number of tens of minutes, is fed with a gas containing oxygen in the circuit upstream of the tank.

Retention of the activated sludge in the tank for a period of time sufficient to allow supersaturation by the gas containing oxygen is indicated as allowing the substantial removal of the solids in suspension.

A method of this kind, as well as being long, employs a fairly complicated device, which is a source of numerous clogging events.

The present invention aims to provide a method and a device which are a better response than those known to date to the practical requirements, particularly in the sense that the invention will allow advanced dewatering, much better than that obtained with the existing techniques, whether employed alone or in combination with such techniques, and will do so very rapidly, since the use of the method according to the invention requires only a few seconds to produce a result.

More particularly, this method allows excellent results to be obtained on its own for highly mineralized sludges (that is, sludges having a % of organic matter in 100% by weight of dry matter of less than from 5 to 15%).

With less mineralized sludges, it is possible to obtain an optimized yield when the method is combined with a complementary separation tool downstream of the device (belt filter or centrifuging), enhancing solids increase by more than 10%, as for example by 25%.

Existing plants can therefore be easily enhanced by addition of one or more reactors that implement the invention, and this, subsequently and for example, will save on the costs of transport and final incineration of the sludges.

The invention, furthermore, exhibits very low electrical consumption and does not use very much consumable material (compressed air, additive).

Moreover, the method employs a simple and very compact device which is easily transportable and which will therefore be able to be installed on sites without easy access.

Continuous operation is possible with the invention, with very relaxed constraints on exploitation.

The processing according to the invention, furthermore, does not give rise to any pollution, while employing a technique which is itself much more economical than those known in the field of liquid/solid separation (centrifuge, press filter, belt filter, continuous oxygenated recirculation, etc.).

Lastly, the invention, surprisingly, produces a new type of porous dewatered cake that constitutes a useful residue.

For this purpose, the invention particularly provides a method for separating the liquid part and the suspended matter of a sludge that are fed in continuous flow at a rate $Q_{EB}$=V/hour, wherein the air is injected at a rate d, characterized in that the flow is formed from at least two partial flows, which are sprayed onto one another in a closed chamber of volume v<V/20, for passage of the flow under pressure, the air being injected into the chamber which is maintained at a pressure greater than a specified value, after which filtration takes place or the suspended matter of the flow thus treated is left to settle in a collection container.

The closed chamber is fed and evacuated continuously at the same rate or substantially at the same continuous inlet and outlet rate of the effluent.

The chamber therefore constitutes an in-line accident of the treated flow without loop recirculation of the effluents to the interior of the chamber.

Advantageously, in the case of settling, the solid part or cake falls to the bottom part of the container, separating from the liquid part, which is discharged continuously.

By closed chamber is meant a tank or a reactor of predetermined closed volume, but, and of course, comprising the means for entry of the continuous flow, and means for exit (generally a tube) of said continuous flow after treatment, at the same rate or substantially at the same rate.

The chamber is therefore a chamber for passage of the flow under pressure.

By a value v<V/20 is meant a lower or an approximately lower value, with a tolerance of the order of ±10% to 20%.

Advantageously v≤V/25 or ≤V/30.

In one advantageous embodiment of the invention the excellent results are attained in particular by virtue of the combination of a plurality of functions in the same small-sized chamber, by provision of four functional zones:

A zone for introduction of slightly compressed air, this zone also hosting suspension, or prevention of settling, of the heaviest particles, which are nevertheless capable of rising within the reactor and of emerging at the top part with the finest particles.

A hydraulic impact zone in which the liquid flows are introduced.

A rise zone of the bed, consisting, for an amount by weight of approximately 1 of gas, of 0.1 of water and of 0.01 of solid. Within this zone, very vigorous agitation is made possible by the provision of air of the recommended quality (rate and pressure).

A decompression zone, regulated for example by a slide valve situated at the top part of the reactor. In the example of this slide valve, it is required to maintain the reactor at a relative pressure of approximately 0.5 to 2 bar.

In advantageous embodiments, moreover, one and/or other of the following arrangements is employed:

- the flow is injected into the chamber of volume v<V/20 via two identical opposite orifices situated in the lower half of said chamber, the air being injected below said orifices, and the flow is removed continuously or intermittently at the top part, by means, for example, of a pressure relief valve that releases above a specified threshold value;
- the air is injected at a rate d>1.5 $Q_{EB}$, as for example greater than 5 $Q_{EB}$, than 10 $Q_{EB}$, or of between 1.5 times and 15 times $Q_{EB}$;
- the air is injected at average pressure. By average pressure is meant between 1.4 bar and 2.5 bar, advantageously between 1.6 bar and 1.9 bar. Such a pressure generates larger bubbles, which will be able to penetrate the medium more effectively, by being distributed randomly within the chamber.
- the collection container is discharged permanently by overflow;
- v≤V/50;
- v≤V/100;
- the rate $Q_{EB}$ is greater than or equal to 15 m3/h, the rate d is greater than or equal to 25 Nm3/h, and the relative pressure in the chamber is greater than or equal to 0.8 bar;
- the rate $Q_{EB}$ is greater than or equal to 20 m3/h, the rate d is greater than or equal to 50 Nm3/h, and the relative pressure in the chamber is greater than 1.2 bar;
- at least one liquid reagent is added continuously at a rate q to the interior of the chamber;
- the reagent is added in proportions of between 0.05% and 0.1% of the dry matter content of the sludge. By dry matter content is meant the % by weight of solid over the total % by weight of the effluent;
- the liquid reagent is a cationic organic flocculant;
- the effluents are degassed on emergence from the chamber, and the gases obtained are used to feed the injection of air in the bottom part;
- the resulting cake is recovered and dewatered by drying, pressing, or centrifuging, to give a solidified pancake.

The invention also provides a product obtained directly by the method as described above.

It likewise provides a solidified sludge pancake obtained with the method described above, this pancake being characterized in that it has a porosity of between 5% and 15%.

The invention also provides a device employing the method as described above.

It further provides a device for separating the liquid part and the suspended matter of a sludge that are fed in continuous flow at a rate $Q_{EB}$=V/h, comprising means for feeding with air at a rate d, and a container for collecting and settling the suspended matter of the flow thus treated, and also means for continuously evacuating the supernatant liquid part of said flow to the exterior of said container, characterized in that said device comprises

- a closed chamber of volume v<V/20 which comprises at least two identical opposite orifices situated in the lower half of said chamber,
- means for catching the sludge and feeding the flow of sludge thus caught into said chamber in at least two partial flows each, respectively, injected via one of said orifices, the means for feeding with air at a rate d being suitable for injecting the air into the chamber below said orifices, and means for removing the flow continuously or intermittently, the pressure in the chamber being greater than a specified threshold value.

The device is advantageously arranged so that the flow is removed at the top part by means of a pressure relief valve which releases above said specified threshold value.

Likewise advantageously, the means for continuous removal of the supernatant liquid part are formed by a gravitational overflow device.

In one advantageous embodiment v≤V/50.

Likewise advantageously v≤V/100.

The invention also provides a device wherein the means for feeding a liquid reagent, at a specified rate, directly into the chamber are provided.

The invention will be better understood from a reading of the description that follows of embodiments which are given as nonlimitative examples. The description makes reference to the accompanying drawings, in which:

FIG. 1 shows the principles of the method for separating liquid and solid in a sludge, according to the embodiment of the invention more particularly described here.

Figure 1:
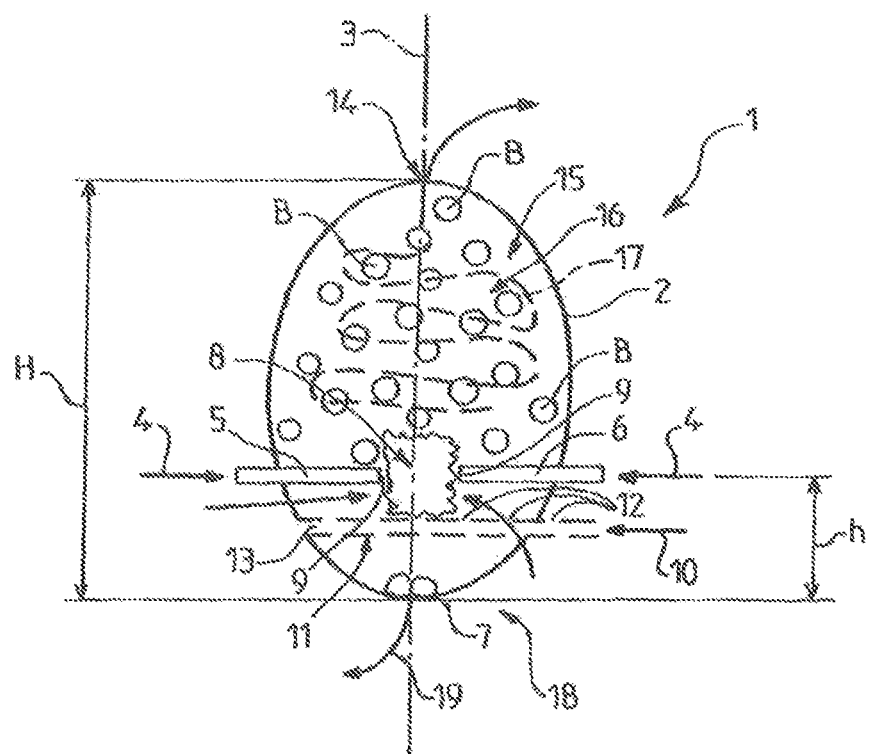
FIG. 1 is a scheme of principle illustrating the processing method according to the invention.

In a reactor 1 formed by an oblong chamber 2 which extends about an axis 3, and has a small volume v of the order, for example, of 50 liters, the effluents (arrows 4) are injected via two opposite ports 5, 6 which are symmetrical with respect to the axis 3 of the chamber.

The ports are situated at the bottom part of the chamber, as for example at a distance h from the base 7 of the chamber, between one fifth and one third of the height H of the chamber.

These two ports, situated opposite one another, allow a pressurized feed of the flow of water highly loaded with dry matter (DM) (for example, τ of DM 10%/total weight), giving rise to a substantial impact at the point where the two flows meet in the zone 8.

In other words, the pumping of the waters from the outside (not shown) that are introduced into the chamber of the small-sized reactor 1, via the two opposing ports, produces an impact between the flows in the zone 8, owing to the outlet pressure of the feed pump or pumps (not shown), which is dependent on the height of water in said feed pumps upstream of the ports, and on the head losses in the circuit.

Conventionally, using commercial industrial pumps and a circuit without excessive aberrations, a pressure of 2 bar at the outlet 9 of the ports into the chamber is readily attainable.

The kinetic energy of pumping is then converted into impact energy, which is maximized by increasing the velocity of introduction into the chamber for the outlet of the ports of regulator jets 9 of reduced size, but compatible with the maximum particle size of the sludge.

Furthermore, and according to the embodiment of the invention more particularly described here, an amount of pressurized air (arrow 10) is introduced below the zone 8.

By pressurized is meant a slight overpressure, which may be between 0.1 bar relative and 1 bar relative in relation to the atmospheric pressure, as for example 0.8 bar relative.

This air is introduced via an air distribution ramp 11, as for example a ramp formed by a circular, coiled or rectilinear pipe, allowing bubbles of air to be introduced with distribution over the surface of the chamber, via orifices 12 which are spread along said pipe 13.

The air may also be brought via a port at the bottom part.

The ramp is situated below the meeting point of the effluents in zone 8, as for example between one tenth and one fifth of the height H of the chamber, and produces large bubbles B, with a bubble diameter, for example, of between 1 mm and 1 cm.

This introduction of air increases the energy level in the chamber, which is in overpressure in relation to its outlet 14 for removal of the effluents after processing.

Also obtained, in upper part 15 of the chamber, is a functional zone 16, in which extremely turbulent mixing, featuring Brownian motion (dashed line 17), is realized.

At the bottom part 18 of the reactor, conventionally, a purge 19 is provided for elements which are too dense, which do not escape via the top of the reactor, this purge being emptied sequentially.

Escaping at the outlet 14 of the reactor are the air, the water, and the sludges, to give, after settling, transparent water which is physically separate from the solid material, with a very low solid matter content, in particular of less than 30 mg/l or even than 10 mg/l, while initially the solid matter content could have approached more than 500 mg/l.

The decolloidized solid matter obtained at this point is more porous and, consequently, is readily compactable. Depending on its initial level of organic matter, it may even be directly pelletizable on emergence from the reactor.

The air is introduced at an average pressure, for example, of between 1.6 bar and 1.9 bar absolute to the pressure in the chamber itself, so that there may be large bubbles in the mixture, which will be able to penetrate the mixture and become distributed randomly within the reactor, to produce the expected mixing.

The air is introduced, moreover, at a high rate d, in other words of 1.5 times to 15 times (in Nm$^3$/h) the rate $Q_{EB}$ of the incoming water (in m$^3$/h).

Since the method according to the invention employs stirring in three phases—solid, liquid, and gaseous—it is necessary at the outlet to carry out separation that takes account of the degassing, of the denser-than-water solid phase, and of the removal of the water.

In one advantageous embodiment, in addition, a coagulant is added (e.g., lime, ferric chloride).

This complementary addition is made, for example, in the functional zone 16.

Accordingly, with a reactor having a diameter of 55 liters and injection nozzles into this reactor with a diameter of 40 mm, up to 20 m$^3$/h of sludge can be processed.

Surprisingly it is observed, furthermore, with the method of the invention that when the pressure in the reactor is greater in terms of relative pressure than 0.8 bar, the feed rate $Q_{EB}$ of the sludgy water formed, for example, by spreading slurries with a DM load of 5%, said DM being obtained from the biodegradation of swamp grass, clay, sand, and various petroleum residues at trace levels (<1%), is greater than 15 m$^3$/h, and when the air rate d is greater than 25 m$^3$/h, exceptional separation is obtained, with a maximum settling rate of a sludge which, after drying, has a new, porous, granular appearance.

With a 55 liter reactor and with 40 mm nozzles for injecting the effluent within, percussion velocity values are obtained that are extremely rapid, and residence times in the reactor are obtained that are particularly short [cf. table I below].

TABLE I

| | m$^3$/h | | | | | | | | | |
|---|---|---|---|---|---|---|---|---|---|---|
| Effluent flow | 1 | 2 | 3 | 4 | 5 | 6 | 7 | 10 | 15 | 20 |
| | m/s | | | | | | | | | |
| Percussion velocity, solid particles | 0.111 | 0.221 | 0.332 | 0.442 | 0.553 | 0.774 | 1.105 | 1.658 | 2.210 | |
| | s | | | | | | | | | |
| Residence time, reactor | 198.00 | 99.00 | 66.00 | 49.50 | 39.60 | 28.29 | 19.80 | 14.85 | 9.9 | |

The gas extracted from the reactor emerges with the water and the sludge at the rate of the pressure booster, and can be recovered, processed, and, where appropriate, recycled for use again at the bottom part of the reactor.

It should be noted that the presence of coarse matter, of the sand, gravel, etc., type, increases the number of impacts and, consequently, enhances the process.

The pressure of the chamber, in turn, is arranged and/or regulated in such a way as to optimize the internal energy by generating an ascending flow emerging from the top.

Such a pressure is therefore specified as a function of the functional features of the circuit (height of water in pumps), but also of the type of effluents and the desired processing rates.

The size eventually selected for the reactor will also be specified by the skilled person as a function of the basic knowledge of an engineer in the field of chemical engineering, and of the diagram of the flows.

The pressure and the emergence are ensured, for example, by means of a slide valve which releases the flow when the given pressure is exceeded.

By virtue of the invention it is therefore possible to obtain advanced dewatering much better than that obtained by virtue of the existing techniques, and within a few seconds.

By way of example, table II below reports the improvement Δ in solids obtained with the method according to the invention for a sludge from the Fos sur Mer industrial treatment station, this sludge having a low mineral content (90% of organic matter), in the field of petrochemicals.

The comparison is between a simple treatment on a belt filter (with a filtering cloth on which the water and sludge are removed by pumping and conveyed between squeeze rolls), and the same belt filter after pretreatment with the method according to the invention.

For a chamber volume v=55 l, variations were made in the parameters of sludge rate $Q_{EB}$ (m$^3$/h), gas rate d(Nm$^3$/h), and relative pressure P inside the chamber (bar), for a specified DM load at the inlet of the chamber (in g/l).

The results are also given in dependence on the initial condition of the sludges—that is, fresh (without settling), not very fresh (after settling for a day), or fermented (several days of settling in the absence of oxygen).

It is seen that a high gas rate (eight times the sludge rate) and a high pressure in the chamber (1.3 bar) enhances solids by 48.8% (trial #10) for a fairly low initial load (DM of 8.2 g/l).

On average (see trials #13 to 16) for a fresh sludge loaded at 32.4 g/l for a gas rate twenty times greater than that of the sludges, and a pressure of 1 bar relative in the chamber, the method according to the invention increases the solids (dry matter (DM) content by weight relative to the total weight of the sludge, i.e.: DM+liquid) from 24 to 36.4%, or on average 30%.

TABLE II

| Trials # | Industrial sludge type, Fos sur Mer | Rate | | Chamber pressure P bar | Inlet DM g/l | Δ solids % | Outlet % |
|---|---|---|---|---|---|---|---|
| | | $Q_{EB}$ sludge m3/h | d gas Nm3/h | | | | |
| 1 | not very fresh | 2.8 | 40 | 0.5 | 24 | | 14.7 |
| 2 | not very fresh | 2 | 50 | 0.8 | 24 | | 20 |
| 3 | not very fresh | 3 | 60 | 1.4 | 28 | | 35.5 |
| 4 | not very fresh | 2 | 60 | 1 | 26 | | 22.1 |
| 5 | not very fresh | 2 | 60 | 1 | 26 | | 21.1 |
| 6 | not very fresh | 2 | 60 | 1 | 26 | | 20.4 |
| 7 | fresh | 1.5 | 60 | 1.1 | 26 | | 26.6 |
| 8 | fresh | 1.3 | 60 | 1 | 26 | | 22.2 |
| 9 | fresh | 1.2 | 60 | 0.8 | 26 | | 24.4 |
| 10 | fermented | 8 | 60 | 1.3 | 8.2 | | 48.8 |
| 11 | fermented | 6.2 | 60 | 1.1 | 11 | | 32 |
| 12 | fermented | 3 | 70 | 0.8 | 24 | | 26.2 |
| 13 | fresh | 3 | 60 | 1 | 32.4 | | 24 |
| 14 | fresh | 3 | 60 | 1 | 32.4 | | 26 |
| 15 | fresh | 3 | 60 | 1 | 32.4 | | 36.4 |
| 16 | fresh | 3 | 60 | 1 | 32.4 | | 30.1 |
| 17 | fresh | 4.4 | 40 | 1.6 | 32.4 | | 27.2 |
| 18 | fresh | 5.6 | 50 | 0.9 | 32.4 | | 33 |
| 19 | not very fresh | 6.5 | 60 | 0.5 | 24 | | 28.2 |

Shown subsequently in table III is an example of results obtained with a single device (without complementary treatment) on sediments (highly mineralized sludge) and with a complementary treatment (belt filter).

The treatment with the invention alone is to be compared with the belt filter alone, which does not exceed an improvement in solids of 15 to 18%.

Excellent results are obtained here even without complementary treatment with filter or centrifuge.

TABLE III

| Trials # | Industrial sludge type, Fos sur Mer | Rate | | Chamber pressure P bar | Inlet DM g/l | Δ solids % | Outlet % |
|---|---|---|---|---|---|---|---|
| | | $Q_{EB}$ sludge m3/h | d gas Nm3/h | | | | |
| 20 | sediments | 1.3 | 60 | 1.1 | 130 | | 61.6 |
| 21 | sediments | 1.2 | 60 | 1.1 | 84 | 56.7 | 69.5 |
| 22 | sediments | 1.3 | 70 | 1 | 84 | 43.2 Alone | 67.1 Alone + Filter |

In addition to this appreciable time gain in the treatment, very low consumption of electricity, of compressed air, and/or additives are required.

The low bulk of the chamber, furthermore, makes it readily transportable, and allows it to be installed in sites where access is difficult, while ensuring continuous operation in great simplicity.

The treatment according to the invention does not give rise to any pollution, and achieves this with a much more economical installation as compared with the other treatment systems to which consideration may be given for the task of liquid/solid separation alone, these being centrifuges, press filters, belt filters, etc.

Figure 2:
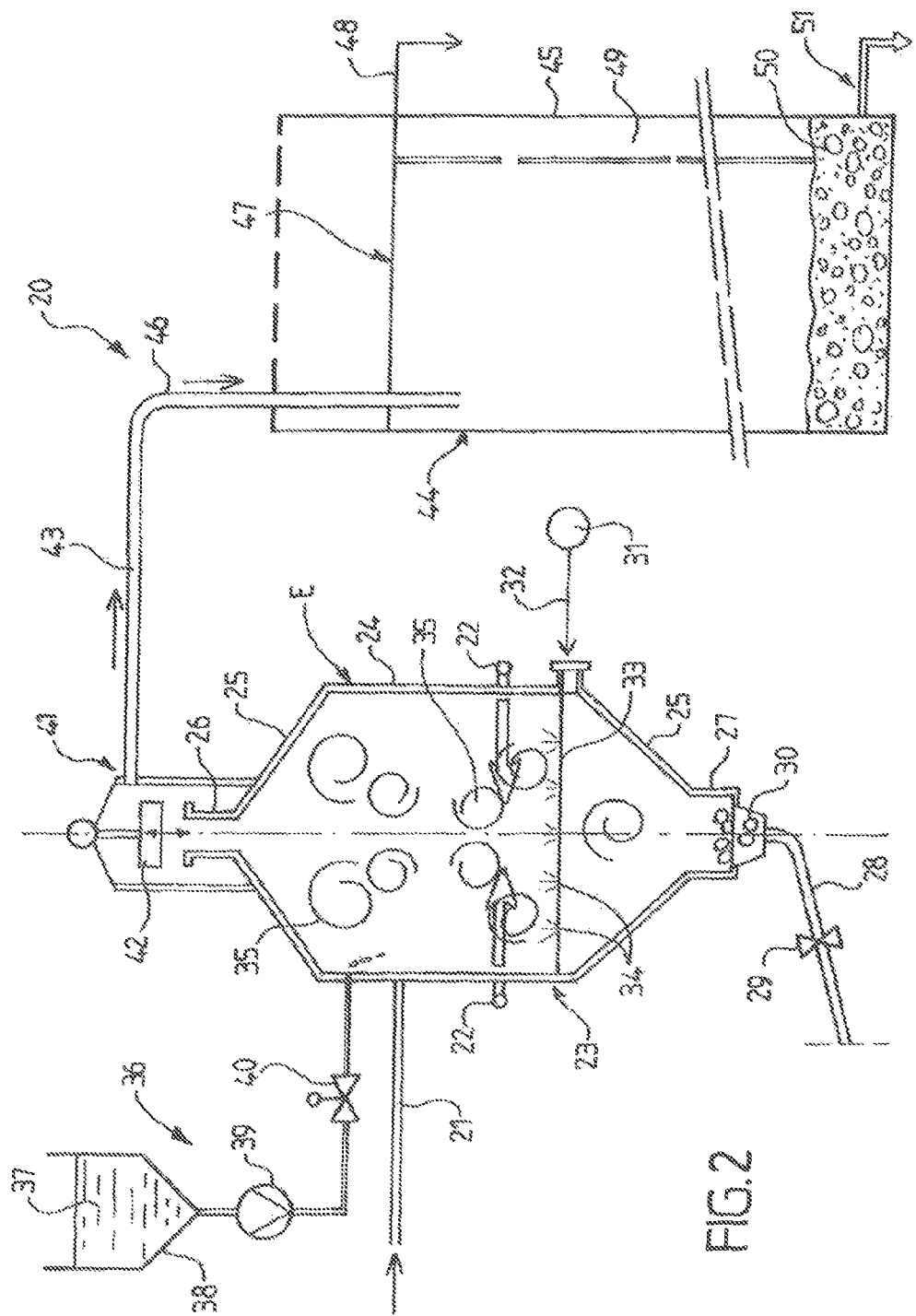
FIG. 2 is a scheme of operation of one embodiment of a device according to the invention.

Shown in FIG. 2 is an operating scheme for a device in accordance with the embodiment of the invention more particularly described here.

The device 20 allows separation of the liquid part from the dry matter of the sludge fed at 21 in continuous flow at a rate $Q_{EB}$=V/h, the feeding at 21 subsequently dividing in two to feed the ports 22.

More specifically, the device 20 comprises a closed, stainless steel chamber E with a volume v<V/20, for example of 55 liters for a rate Q=V/h of 1.5 m³/h, comprising at least two identical opposite orifices or ports 22, situated in the lower half 23 of the chamber, at a distance for example which is equal to one third of the height of the chamber.

The chamber is composed for example of a cylindrical part 24 which is terminated at the top part and at the bottom part by two identical conical zones 25, with angles at the vertex of the order of 120°, for example.

Each end is itself terminated by an upper tube 26 and lower tube 27. The lower tube 27 is connected to a pipeline 28, equipped with a slide valve 29, for intermittent removal of the suspended material 30 which would have been settled, in the base 27 of the chamber.

The device 20 further comprises means 31 for feeding air 32 to the chamber at a rate d below the orifices 22.

This feeding takes place, for example, by way of a rectilinear pipe or tube 33, with a small diameter, of 5 cm in diameter for example, and with a length substantially equal to the diameter of the cylindrical chamber, comprising regularly spaced nozzles 34, for exit of the compressed air into the chamber in a distributed way, creating substantial bubbles which will give rise to substantial agitation (swirls 35).

Means 36, known per se, for feeding a liquid reagent 37, a coagulant, for example, are provided. These means are formed, for example, by a storage vat 38, which feeds—by means of a metering pump 39 and a remote-controlled slide valve 40—the interior of the chamber above the ports 22, in the turbulence zone.

The device 20 further comprises means 41 for removing continuously the liquid that has penetrated the chamber, by way of a slide valve or other valve 42, which opens above a specified pressure in the chamber, of 1.3 bar for example.

It is also possible not to provide a slide valve, with the circuit downstream itself constituting the head loss required to maintain the chamber in relative overpressure.

The effluent 43 is then removed at the top part, ending up in a settling vat 44 which is known per se.

For example, this settling vat 44 is composed of a cylindrical tank 45 into which the removal pipe 46 opens below the operating level 47, in order to limit turbulences.

The vat 44 itself discharges via overflow at 48, through a nonturbulent side tank portion 49, which is separated from the rest of the tank by an openwork wall by location.

The decanted solid matter 50 is removed at the bottom part 51, and can be processed subsequently.

Figure 3:
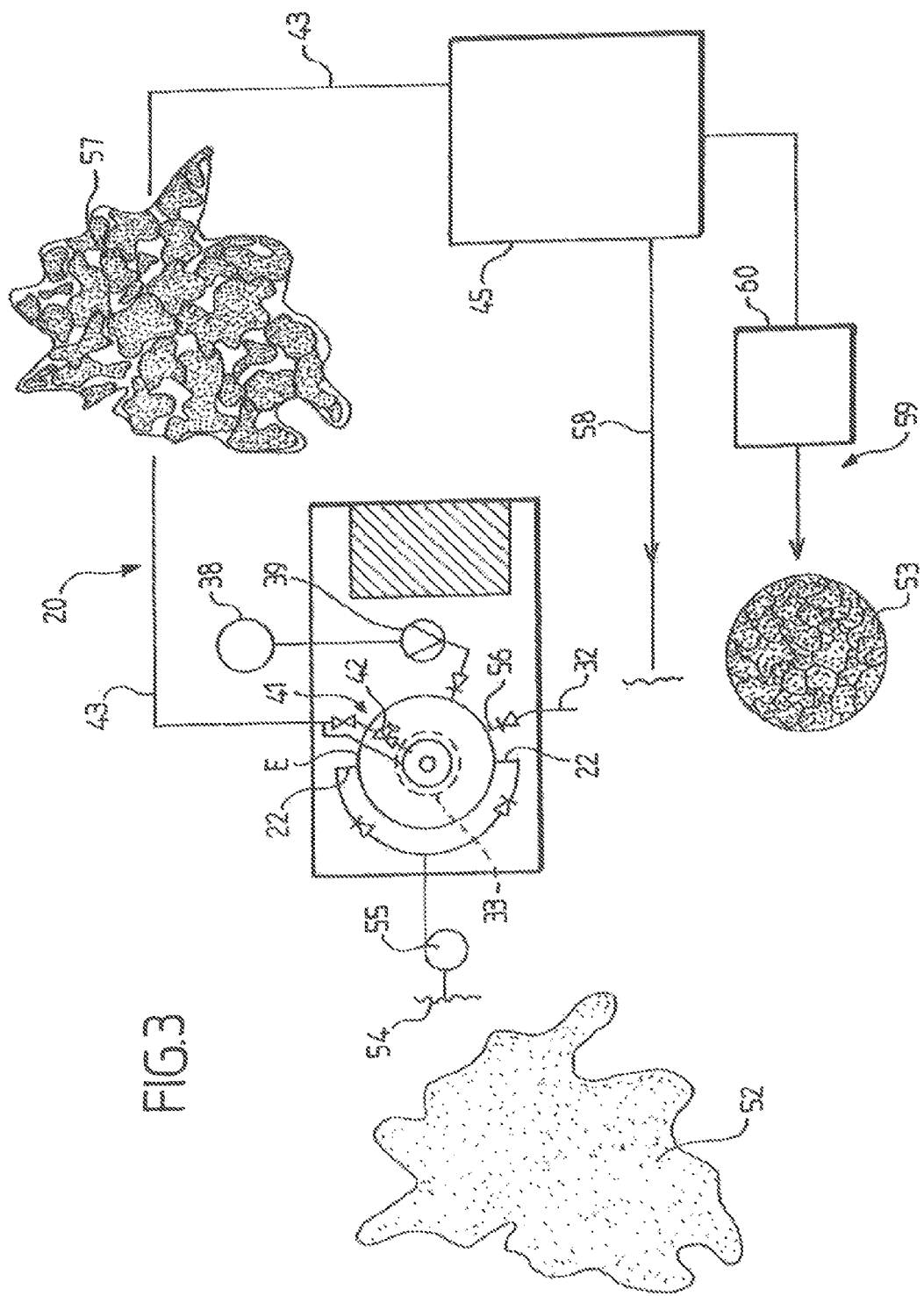
FIG. 3 is a view illustrating schematically the conversion of a sludge, using a device according to one embodiment of the invention.

FIG. 3, in a plan view, shows the device 20 of FIG. 2 which, from the sludge 52, produces the pancake 53, according to the invention.

In the remainder of the description, the same references will be used to denote the same elements.

Starting from the sludge or effluent 52 loaded with suspended material, which is pumped into an environment 54 by means of a pump 55 having a water level $H_o$ at a rate $Q_{EB}$, the chamber E is fed by way of the two ports 22 which are situated opposite, facing one another. At each port, therefore, the rate is divided by two $Q_{EB}/2$.

The feed of air 32 is made below the ports, as described above, via a port 56.

A reagent (coagulant such as ferric chloride, or lime), which is known per se and should be adapted by the skilled person depending on the effluents processed, is fed continuously into the chamber E from the vat 38 via the metering pump 39.

Following processing in the chamber as described above, the effluents are removed at the top part, at 41, to give the defragmented, decolloidized effluent 57 as shown schematically in FIG. 3.

This decolloidized and defragmented effluent is then fed into the settling vat 45. Following settling, which takes place continuously within several seconds, the water then observed at 58 is extremely clear, transmitting, for example, 99% of the light, or even 99.5%.

At 59, following possible complementary compacting treatment at 60, a particularly advantageous sludge pancake is obtained, which is aerated and solidified and has an excellent porosity of between 5% and 15%.

A product of this kind obtained with the method according to the invention is new and will form matter for subsequent uses, as top soil, as a raw material in construction, etc.

With reference to FIG. 3, a description will now be given of the operation of a treatment regime in accordance with the embodiment of the invention more particularly described here.

From an environment, for example a stream 54 loaded with sludge 52, this sludge is extracted by pumping (55).

In one application example, the level of sludge, i.e., the percentage of dry matter in terms of solid material, is for example between 3 and 10%.

This sludge feeds the chamber E, for example of volume V=100 l, at a rate for example of between 5 and 50 m$^3$/h, for example 15 m$^3$/h.

As described above, this effluent is injected into the reactor via the two opposite ports 22. Simultaneously, air is fed via the lower ramp 33 of the reactor, with a rate greater, for example, than 25 Nm$^3$/h.

The pressure within this reactor is between 0.3 and 1.5 bar relative, for example greater than 0.8 bar relative, depending on the water level of the pump and/or pumps which feed the effluents, and also on the head loss created by the chamber itself and by the removal slide valve 42 which is situated at the top part of said chamber.

The pressure within the reactor may in particular be regulated by means of this upper slide valve or other valve.

The effluent, thus agitated and fed with air, remains in the reactor for a period corresponding to the relative ratio between the rates, the volume, and the pressure.

It is therefore retained, for example, for a residence time of several seconds, for example of less than 1 minute, before being removed.

This time may even be very much less, since with an effluent rate of greater than 20 m$^3$/h, residence within the chamber may for example be for a time of less than 10 seconds.

The sludge feed rate itself has a direct action on the percussion velocity, in accordance with the table produced above, given that the contact time and residence time in the reactor under pressure also affect the rate of formation of the flocs and of their settling.

The rate of air and the effect of the pressure in the reactor are also elements which, with a view to the desired result, will be adapted, in a manner which is within the abilities of the skilled person.

When the sludges have been processed, they emerge from the reactor at a pressure corresponding to the flow pressure of the rate of the fluid in the pipe 43, to the settling vat 45, in which settling will take place in a manner known per se.

The water obtained as a supernatant is of a high purity and is itself removed continuously at 58.

The sludge obtained at the bottom part of the settling vat is removed either continuously or discontinuously, according to specified periods—for example, once a day.

The action of removing this sludge again very quickly increases its quality, particularly with regard to its good porosity.

The treatment carried out by virtue of the method and reactor according to the invention therefore yields a porous dewatered cake, with the recovered sludge being empty, dry, and manipulable. A number of hours are sufficient, as against three months in the context of the use of so-called conventional drying, to obtain a comparable result, and the features of the resulting sludge as well are much better with the invention, since the sludge is more readily recyclable.

As will be obvious, and as also results from the text above, the present invention is not limited to the embodiments that have been more particularly described. Instead, it encompasses all variants of those embodiments, and especially those in which the orifices may be regulator jets, tubes reaching into the interior of the chamber in order to minimize the distance between the outlets and increase the force of the impacts.

The invention claimed is:
1. A method for extracting liquid from a mineralized sludge comprising:
  injecting, through inlets, at least two partial flows of the mineralized sludge into a closed chamber having an outlet, wherein the at least two partial flows form a continuous flow of the mineralized sludge for passage into the closed chamber via the inlets, wherein the continuous flow has a rate $Q_{EB}$=V/hour, V being a volume, and wherein the closed chamber has a volume of v<V/20, and wherein the closed chamber is maintained in overpressure relative to atmospheric pressure;
  injecting air into the closed chamber, wherein the injecting of the at least two partial flows and the injecting of the air causes a turbulent mixing of the at least two partial flows, resulting in a mixture;
  circulating a turbulent flow of the mixture to the outlet of the closed chamber;
  discharging at least a portion of the mixture from the closed chamber via the outlet;
  providing the portion to a collection container to allow for separation of solids and the liquid; and
  continuously discharging the liquid.
2. The method as claimed in claim 1, wherein the air is injected with a rate d>1.5 $Q_{EB}$.
3. The method as claimed claim 1, wherein the air is injected at a pressure of between 1.4 bar and 2.5 bar.
4. The method as claimed in claim 1, wherein:
  the at least two partial flows are injected into the closed chamber via two identical opposite orifices situated in a lower half of the closed chamber,
  the air being injected below the two identical opposite orifices,
  the outlet is situated at a top part of the closed chamber, and
  the agitation applies energy on colloidal structures to cause colloids present in the mineralized sludge to be removed from suspension.
5. The method as claimed in claim 1, wherein continuously discharging the liquid comprises discharging the liquid from the collection container by overflow.
6. The method as claimed in claim 1, wherein v≤V/50.
7. The method as claimed in claim 6, wherein v≤V/100.
8. The method as claimed in claim 1, wherein the rate $Q_{EB}$ is greater than or equal to 15 m³/h, the air is injected at a rate d greater than or equal to 23 m³/h, and the overpressure is greater than or equal to 0.8 bar relative to the atmospheric pressure.
9. The method as claimed in claim 8, wherein the rate $Q_{EB}$ is greater than or equal to 20 m³/h, the rate d is greater than or equal to 50 m³/h, and the overpressure is greater than 1.2 bar relative to the atmospheric pressure.
10. The method as claimed in claim 1, further comprising:
  continuously adding at least one liquid reagent at a rate q to an interior of the closed chamber.
11. The method as claimed in claim 10, wherein the at least one liquid reagent is added to a turbulence zone of the closed chamber in proportions of between 0.05% and 0.1% of dry matter content of the mineralized sludge.
12. The method as claimed in claim 1, wherein the method is performed without adding flocculant.
13. The method as claimed in claim 1, further comprising:
  degassing effluents at the outlet of the closed chamber; and
  using gases obtained from the degassing to feed the injecting of the air at a bottom part of the closed chamber.
14. The method as claimed in claim 1, wherein the separation results in a cake formed by the solids, and wherein the method further comprises:
  dewatering the cake by drying, pressing, or centrifuging, resulting in a solidified pancake.
15. The method as claimed in claim 14, wherein the solidified pancake has a porosity of between 5% and 15%.
16. The method of claim 1, wherein the mineralized sludge comprises organic matter from 5% to 15% by weight of dry matter.
17. A method for extracting liquid from a mineralized sludge comprising:
  injecting at least two partial flows of the mineralized sludge into a closed chamber, wherein the at least two partial flows form a continuous flow having a rate $Q_{EB}$=V/hour, V being a volume, and wherein the closed chamber has a volume of v<V/20;
  injecting air into the closed chamber, wherein the injecting of the at least two partial flows and the injecting of the air causes a turbulent mixing of the at least two partial flows and results in a mixture and an increase of an internal pressure of the closed chamber;
  after the internal pressure of the closed chamber has exceeded a specified value, discharging, via an outlet of the closed chamber, at least a portion of a turbulent flow of the mixture;
  providing the portion to a collection container to allow for separation of solids and the liquid; and
  continuously discharging the liquid from the collection container.
18. The method as claimed in claim 17, wherein the mineralized sludge comprises organic matter from 5% to 15% by weight of dry matter.
19. The method as claimed in claim 17, wherein the separation results in a cake formed by the solids.
20. A method for extracting liquid from a mineralized sludge comprising:
  injecting at least two partial flows of the mineralized sludge into a closed chamber, wherein the at least two partial flows form a continuous flow of the mineralized sludge having a rate $Q_{EB}$=V/hour, V being a volume, and wherein the closed chamber has a volume of v<V/20;
  injecting air into the closed chamber, wherein the injecting of the at least two partial flows and the injecting of the air causes a turbulent mixing of the at least two partial flows and results in a mixture and an increase in an internal pressure of the closed chamber;
  after the internal pressure of the closed chamber has exceeded a specified value, opening a valve to discharge at least a portion of a turbulent flow of the mixture from the closed chamber;
  providing the portion to a collection container to allow for separation of solids and the liquid; and
  continuously discharging the liquid from the collection container.
21. The method as claimed in claim 20, wherein the mineralized sludge comprises organic matter from 5% to 15% by weight of dry matter.

* * * * *

UNITED STATES PATENT AND TRADEMARK OFFICE
CERTIFICATE OF CORRECTION

PATENT NO.       : 9,890,068 B2
APPLICATION NO.  : 13/881561
DATED            : February 13, 2018
INVENTOR(S)      : Patrice Capeau et al.

It is certified that error appears in the above-identified patent and that said Letters Patent is hereby corrected as shown below:

In Column 11, Claim 3, Line 26:
Please delete "method as claimed claim 1" and insert --method as claimed in claim 1--

Signed and Sealed this
Fifth Day of June, 2018

Andrei Iancu
*Director of the United States Patent and Trademark Office*